United States Patent [19]

Sugiyama

[11] Patent Number: 4,519,062

[45] Date of Patent: May 21, 1985

[54] SIGNAL PICKUP DEVICE

[75] Inventor: Hiroyuki Sugiyama, Isehara, Japan

[73] Assignee: Victor Company of Japan, Limited, Yokohama, Japan

[21] Appl. No.: 390,737

[22] Filed: Jun. 21, 1982

[30] Foreign Application Priority Data

Jun. 22, 1981 [JP] Japan .................................. 56-91895

[51] Int. Cl.³ ............................................ G11B 11/00
[52] U.S. Cl. .................................. 369/126; 369/128; 369/129
[58] Field of Search ............... 369/126, 128, 129, 145, 369/151

[56] References Cited

U.S. PATENT DOCUMENTS 3,444,333 5/1969 Tourtellot .......................... 369/128
3,806,668 4/1974 Hilliker ................................ 369/129
4,080,625 3/1978 Kawamoto et al. ................. 369/129

Primary Examiner—Alan Faber
Attorney, Agent, or Firm—Pollock, VandeSande & Priddy

[57] ABSTRACT

A signal pickup device for picking up signals from a video disc includes a base plate, a transducer unit printed on the base plate and having an oscillator, transformer, a resonator, an inductor, and a preamplifier mounted on the base plate and located longitudinally of the transducer unit. The preamplifier is of an elongated structure extending transversely of and substantially across the transducer unit. The oscillator and the preamplifier are supplied with electric power via a power supply terminal which is disposed substantially midway between the oscillator and the preamplifier. With this construction, the signal pickup device is reduced in width, and is of a unitary structure which can be easily positioned in place and results in high noise resistance.

5 Claims, 3 Drawing Figures

SIGNAL PICKUP DEVICE

BACKGROUND OF THE INVENTION

The present invention relates to a signal pickup device, and more particularly to a signal pickup device especially for use in a video disc player.

SUMMARY OF THE INVENTION

It is an object of the present invention to provide a signal pickup device for use in video disc players which is minimized in width for the reduction of the size of the video disc players.

Another object of the present invention is to provide a signal pickup device having a power supply terminal which is so located to shorten the length of connecting wires extending therefrom to various components of the signal pickup device.

Still another object of the present invention is to provide a signal pickup device of a unitary structure which can be easily positioned in place and is highly resistant to external noise.

According to the present invention, a signal pickup device comprises a single base plate, a transducer unit including an oscillator, a transformer, resonator and an inductor which are all fabricated on the single base plate, are elongated in shape, and are juxtaposed parallel to each other, a preamplifier mounted on the single base plate at a longitudinal end of the transducer unit, and a power supply terminal disposed substantially at an interface between the transducer unit and the preamplifier for supplying electric power to the oscillator and the preamplifier.

BRIEF DESCRIPTION OF THE DRAWINGS

The present invention will be described in detail by way of illustrative example with reference to the accompanying drawings, in which.

DETAILED DESCRIPTION

Figure 1:
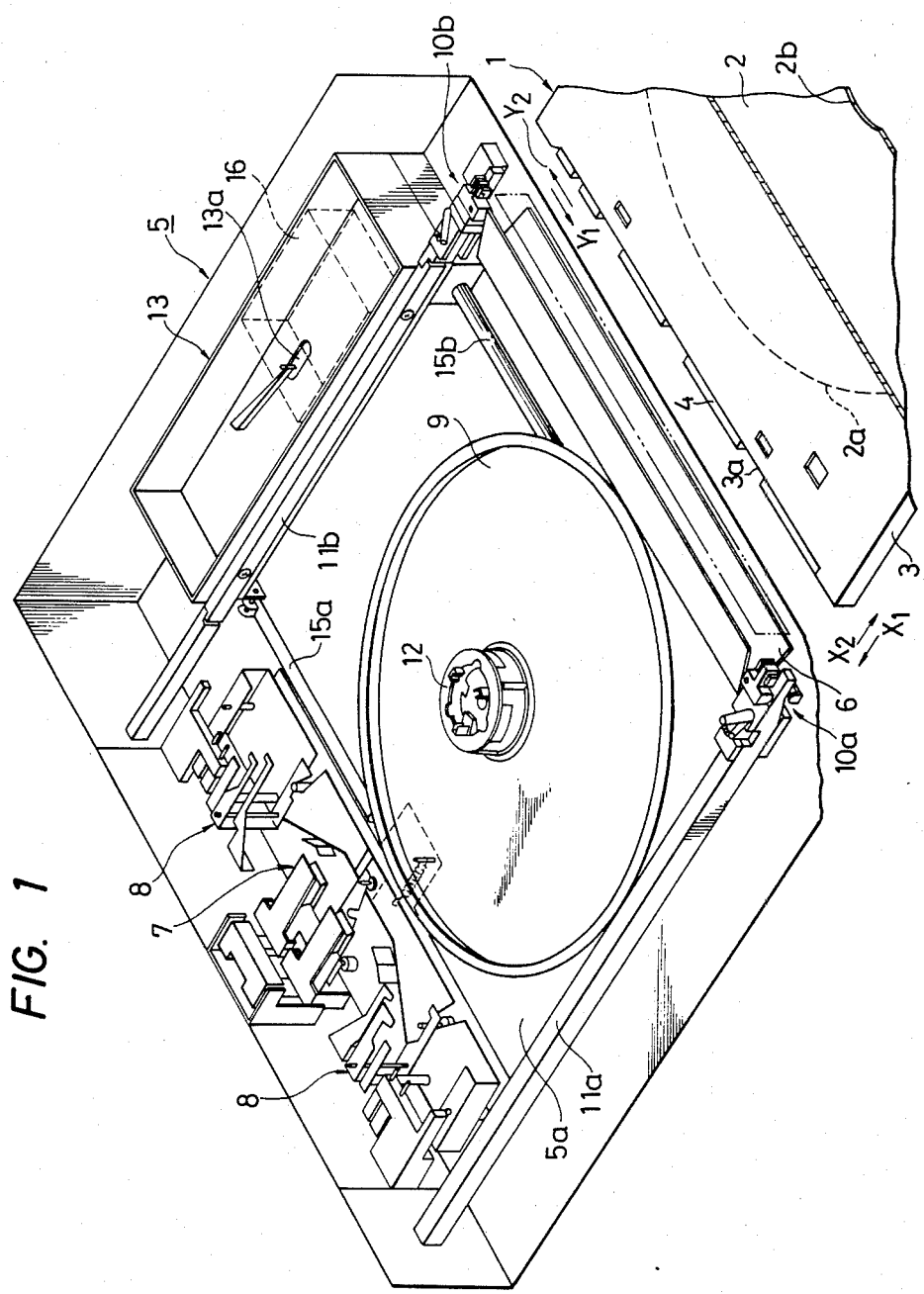
FIG. 1 is a fragmentary perspective view of a video disc assembly and a video disc player which incorporates a signal pickup device according to the present invention.

FIG. 1 illustrates a video disc assembly 1 and a video disc player 5, the video disc assembly 1 being shown ready for insertion into the video disc player 5 for a playback mode of operation. The videe disc assembly 1 comprises a video disc 2 containing video and audio information in the form of a multiplicity of depressions or pits arranged in a spiral track, a square-shaped protective container or casing 3 housing the video disc 2 therein, and a lid plate 4 placed in a slot 3a in the container 3 to close the slot 3a, thus retaining the video disc 2 in the container 3 against accidental removal therefrom.

The video disc player 5 includes a slot opener 6 normally positioned at a disc inlet for opening the slot 3a in the container 3 when the video disc assembly 1 is about to enter the video disc player 5, a clamp mechanism 7 disposed remotely from the disc inlet for clamping an outer peripheral groove guard 2a of the video disc 2 as loaded in the video disc player 5, and latch mechanisms 8, 8 for latching the lid plate 4 of the video disc assembly 1 which is inserted in the video disc player 5. The video disc player 5 also has a turntable 9 rotatably disposed in a disc storage space 5a in the video disc player 5, a pair of laterally spaced slides 10a, 10b supporting the slot opener 6 therebetween and movable respectively along a pair of guide rails 11a, 11b extending from the disc inlet toward the latch mechanisms 8, 8 and located one on each side of the turntable 9, and a support ring 12 vertically movably mounted on the turntable 9 for holding down the video disc 2 placed on the turntable 9. A pickup mechanism 13 is guided by a pair of spaced guide rails 15a, 15b to move across one of the guide rails 11a for traversing the video disc 2 supported on the turntable 9.

When the video disc 2 is to be played back, the operator inserts the video disc assembly 1, with the lid plate 4 ahead, into the video disc player 5 in the direction of the arrow X1. As the video disc assembly 1 enters the disc storage space 5a, the video disc assembly 1 is supported by the slides 10a, 10b on its lateral edges with the slot 3a being spread by the slot opener 6. Continued insertion of the video disc assembly 1 into the disc storage space 5a causes the slides 10a, 10b as well as the slot opener 6 to move along the guide rails 11a, 11b. When the video disc assembly 1 is fully introduced in the video disc player 5, the lid plate 4 is locked by the latch mechanisms 8, 8 and the outer peripheral groove guard 2a of the video disc 2 is clamped by the clamp mechanism 7. Then, the operator pulls the disc ontainer 3 of the video disc player 5 in the direction of the arrow X2, leaving the video disc 2 and the lid plate 4 in the disc storage space 5a. The video disc 2 is now held by the support ring 12 which fits in a central hole 2b in the video disc 2 and which is in a lifted position to keep the video disc 2 spaced upwardly from the turntable 9 in concentric relation therewith.

Now the operator acts on a control panel (not shown) to put the video disc player 5 in a playback mode of operation. The clamp mechanism 7 is released to disengage the video disc 2, and the support ring 12 is lowered to place the video disc 2 on the turntable 9, whereupon the video disc 2 is securely mounted on the turntable 9 by the support ring 12 which fits in the central hole 2b and holds down the video disc 2 against the turntable 9. The turntable 9 with the video disc 2 carried thereon is then caused by a motor (not shown) to rotate about its own axis at a high speed. The pickup mechanism 13 is now allowed to travel along the guide rails 15a, 15b toward the turntable 9 in the direction of the arrow Y1 until the pickup mechanism 13 arrives at a lead-in position on the video disc 2. The pickup mechanism 13 then stops, and a pickup needle 13a is lowered into contact with the video disc 2 to start playing back of the video disc 2.

When the operator operates the control panel to stop the playback operation of the video disc player 5, the turntable 2 is stopped, the pickup needle 13a is raised off the video disc 2, and the pickup mechanism 13 is moved in the direction of the arrow Y2 back to a rest position (shown in FIG. 1). The support ring 12 is lifted away from the turntable 9 to raise the video disc 2, whereupon the latter is clamped by the clamp mechanism 7 so as to lie above the turntable 9. The container 3 which is empty is inserted again into the disc storage space 5a, and then pulled out with the video disc 2 placed back in the container 3 and the lid plate 4 fitted in the slot 3a to retain the video disc 2 in the container 3. The video disc assembly 1 is now removed from the video disc player 5.

The width of the video disc player 5, that is, the transverse dimension thereof in the directions of the arrows Y1, Y2, is substantially determined by the diameter of the turntable 9 and the width of the pickup mechanism 13. In order to reduce the width of the video disc player 5, it is necessary that especially the pickup mechanism 13 be as small in width as possible since the diameter of the turntable 9 cannot be reduced by an appreciable extent because of the necessity of supporting a video disc stably thereon.

Figure 2:
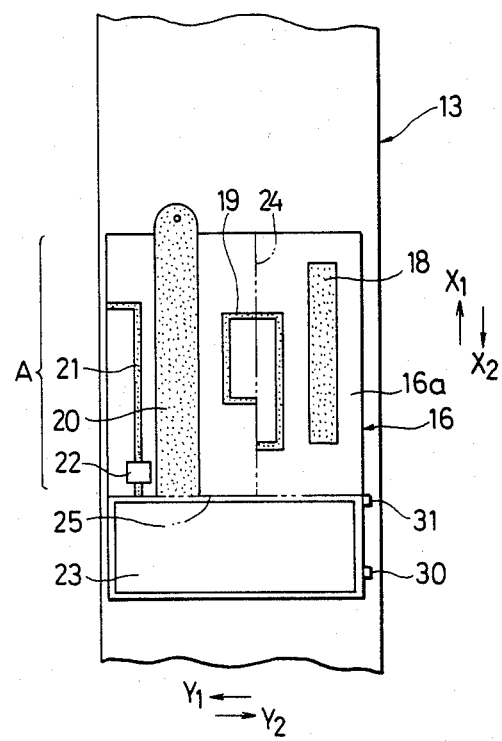
FIG. 2 is an enlarged plan view of a transducer in the signal pickup device.
Figure 3:
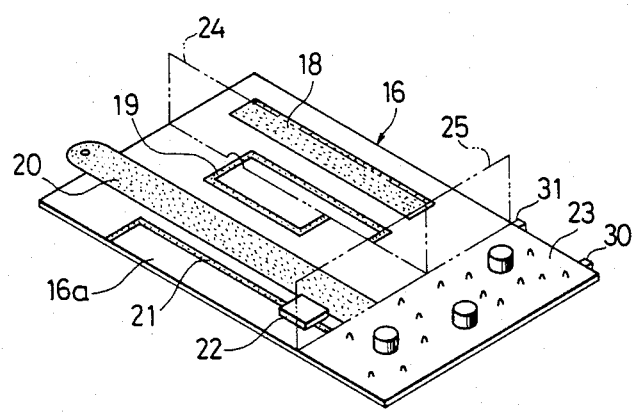
FIG. 3 is a perspective view of the transducer shown in FIG. 2.

According to the present invention, the pickup mechanism 13 is constructed to reduce its width as much as possible as shown in FIGS. 2 and 3. The pickup mechanism 13 includes a transducer 16 for converting variations in electrostatic capacity between the pits on the video disc 2 and the pickup needle 13a into corresponding electrical signals. The transducer 16 is fabricated on a printed circuit board including a single base plate 16a, a transducer unit A and a preamplifier 23 both mounted on the base plate 16a. The transducer unit A comprises an oscillator 18, a transformer 19, a resonator 20, an inductor 21, and a diode 22 coupled to the inductor 21. The oscillator 18, transformer 19, resonator 20, and inductor 21 are elongated in shape longitudinally of the pickup mechanism 13 and juxtaposed parallel to each other in the directions of the arrows Y1, Y2 which are normal to their longitudinal direction for avoiding mutual induction therein. The transducer 16 also includes a pair of shield plates 24, 25 one extending perpendicularly to each other. The oscillator 18 includes an oscillator element (not shown) for generating an oscillating signal which will be converted by the transducer unit A into electrical signals indicative of pit-dependent information stored in the video disc. The electrical signals are then supplied to and preamplifier 23 wherein they are amplified, and the amplified signals are then fed via a signal output terminal 30 to a power amplifier (not shown) for further signal processing.

The preamplifier 23 is of an elongated structure positioned at a longitudinal end (oriented in the direction of the arrow X2) of the transducer unit A and extending transversely of and fully across the transducer unit A in the directions of the arrows Y1, Y2.

With the elements in the transducer unit A extending longitudinally along the pickup mechanism 13, and the preamplifier 23 lying longitudinally of the transducer unit A and transversely across the pickup mechanism 13, the width of the pickup mechanism 13 is smaller than would otherwise be the case with the preamplifier 23 differently located. The pickup mechanism 13 thus minimized in width results in a dimensional reduction of the video disc player 5 in the direction of the arrows Y1, Y2.

The oscillator 18 and the preamplifier 23 are supplied with electric power from a power supply (not shown) through a power supply terminal 31 mounted on the base plate 16a substantially at an interface between the transducer A and the preamplifier 23, that is, substantially midway between the oscillator 18 and the preamplifier 23. The power supply terminal 31 thus located shortens the length of wires connected between the oscillator 18 and the preamplifier 23, resulting in a reduced tendency for the wires to pick up external noise.

The signal output terminal 30 of the preamplifier 23 is disposed closely to the oscillator 18, but may be located in an opposite position across the preamplifier 23, i.e., on the left-hand side of the preamplifier 23 as shown in FIG. 2. Signals from the oscillator 18 can, however, more efficiently be picked up via the preamplifier 23 through the signal output terminal 30 which is positioned as illustrated.

With the construction of the present invention, the transducer 16 is fabricated as a single unit on the base plate 16a. Transducers 16 of such a unitary structure are susceptible to less variations in electrical performance than would be the case with transducers composed of separate components. Furthermore, the unitary transducer 16 can be easily positioned in place and is highly immune to noise.

Although a certain preferred embodiment has been shown and described, it should be understood that many changes and modifications may be made therein without departing from the scope of the appended claims.

What is claimed is:

1. A signal pickup device comprising:
   a single base plate;
   a pickup needle for picking up an information-dependent quantity;
   a transducer unit disposed adjacent to said pickup needle for converting said information-dependent quantity into an electrical signal and including an oscillator, a transformer, a resonator and an inductor which are all fabricated on said single base plate, elongated in shape, and juxtaposed parallel to each other transversely in the order named;
   a preamplifier mounted on said single base plate and positioned adjacent to and across a longitudinal end of said transducer unit; and
   a power supply terminal disposed substantially at an interface between said transducer unit and said preamplifier for supplying electric power to said oscillator and said preamplifier.

2. A signal pickup device according to claim 1, wherein said preamplifier is elongated transversely of and extends substantially fully across said transducer unit.

3. A signal pickup device according to claim 1, wherein said power supply terminal is located substantially midway between said oscillator and said preamplifier.

4. A signal pickup device movable in a direction radially over a circular information storage medium for picking up an information-dependent quantity therefrom, said signal pickup device comprising:
   a single base plate;
   a pickup needle for picking up the information-dependent quantity;
   a transducer unit disposed adjacent to said pickup needle for converting said information-dependent quantity into an electrical signal and including an oscillator, a transformer, a resonator and an inductor which are all fabricated on said single base plate, elongated in shape, and juxtaposed parallel to each other transversely in the order named;
   a preamplifier mounted on said single base plate and positioned adjacent to and across a longitudinal end of said transducer unit; and
   a power supply terminal disposed substantially at an interface between said transducer unit and said preamplifier for supplying electric power to said oscillator and said preamplifier.

5. A signal pickup device according to claim 4, wherein said preamplifier is elongated in said direction and extends transversely of and substantially fully across said transducer unit.

* * * * *